(No Model.)

W. A. DOUGLASS.
WHEEL SUPPORT FOR BICYCLES.

No. 581,575. Patented Apr. 27, 1897.

Witnesses:
J. B. McGirr.
J. P. Appleman.

Inventor
Wm. A. Douglass,
By Howson & Howson
his Attys

THE NORRIS PETERS CO., PHOTO-LITHO., WASHINGTON, D. C.

UNITED STATES PATENT OFFICE.

WILLIAM ARCHIE DOUGLASS, OF NASHVILLE, TENNESSEE.

WHEEL-SUPPORT FOR BICYCLES.

SPECIFICATION forming part of Letters Patent No. 581,575, dated April 27, 1897.

Application filed May 14, 1896. Serial No. 591,546. (No model.)

*To all whom it may concern:*

Be it known that I, WILLIAM ARCHIE DOUGLASS, a citizen of the United States, residing at Nashville, county of Davidson, and State of Tennessee, have invented certain new and useful Improvements in Wheel-Supports for Bicycles, of which the following is a specification.

My invention relates to bicycle-wheel supports, and particularly to such supports in the form of attachments that can be readily applied to any kind of wheel now on the market; and my objects are to provide an attachment of this character which shall be light, adding little weight to the wheel, and which shall be capable of application to all kinds of bicycles, though it is particularly adapted as an attachment to a safety-bicycle. Heretofore it has been proposed to apply such wheel-supports to bicycles, but in some cases the construction has been such as to limit the use of the support to a man's wheel or to an old-style wheel, while in other cases the adjustment has been so constructed that it could not be applied to existing wheels without disconnecting some of the parts of the bicycle.

By my invention I provide a wheel-support which can be readily adapted to existing bicycles without disconnecting or changing any parts of the bicycle and which when applied to a woman's wheel acts also as a perfect safeguard for dresses, and which also can be quickly and readily adjusted to different heights to raise or lower the supporting-wheels, as desired.

With this object in view my invention consists in the novel construction and combination of parts hereinafter described, and pointed out in the claims, with reference to the accompanying drawings, in which—

Figure 1:
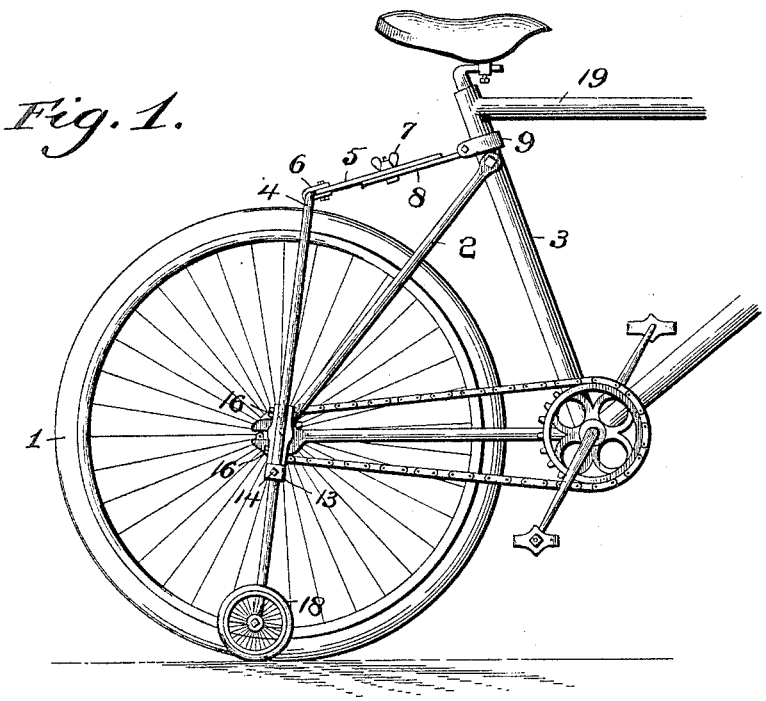
Figure 3:
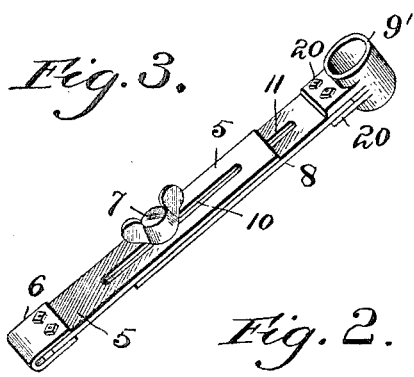
Figure 2:
Figure 4:
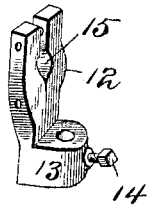

Figure 1 is a side elevation of the rear wheel of a bicycle and adjacent parts, showing my invention applied thereto. Fig. 2 is a rear elevation of the rear wheel with the bicycle-frame removed to better illustrate the application of my invention thereto. Figs. 3 and 4 are details hereinafter referred to.

Referring now particularly to the drawings, in which the same characters designate corresponding parts in all the views and which views illustrate the application of my invention to a safety-bicycle, to which it is particularly adapted, 1 indicates the rear wheel mounted upon the rear axle $a$, supported by the rear fork 2, attached to the seat pole or support 3 in the usual manner. Secured to the seat-support 3, preferably below the horizontal frame 19, is a strap 9, to which is clamped a flat bar 8, provided with a slot 11, the said bar being inclined downwardly, as shown, and slidably mounted upon the said fixed bar is a movable bar 5, provided with a slot 10, the two bars being adjustably secured together by means of a set-screw passing through the slots therein and provided with a fly-nut 7.

Hinged to the bar 5 by means of a suitable strap 6 is a supplemental fork 4, the legs of which embrace the rear wheel and pass downwardly outside of the rear fork and through lugs 13 on bifurcated guide-brackets 12, having the clamping-jaws 15, which brackets are clamped to the rear axle $a$ by means of set-screws 16, and thus frictionally held thereon. The lugs 13 are provided with set-screws 14, which are adapted to clamp and hold the legs of the supplemental fork 4 in any desired position, the said legs passing loosely through the holes in the lugs. The legs of the supplemental fork are provided with horizontal extensions 17 at the lower ends, forming bearings upon which the small wheels 18 are journaled. These wheels are preferably provided with solid rubber tires, as shown.

As shown in Fig. 3, instead of the strap 9 for securing the adjustable fork-support to the frame of the bicycle I may use a ferrule 9', provided with jaws 20, between which jaws the bar 8 may be secured by set-screws or bolts and nuts, as desired. In this case the ferrule would be slipped over the end of the seat-pole 3 and retained above the horizontal frame 19, though I prefer to use the simple strap 9. (Shown in Fig. 1.) From this description it will be seen that the supplemental fork is adjustably secured to the bicycle-frame and can be raised and lowered by easing the thumb-screw 7 and the set curves 14, thus permitting the bar 5 to slide up and down on the fixed bar 8, a greater or less degree of adjustability being effected by a greater or less inclination of the fixed bar 8.

If desired, the small supporting-wheels 18 may be lifted entirely out of contact with the ground and the bicycle ridden without the aid of said wheels.

I should observe that my present invention is designed more especially for the use of beginners, and to this end the attachment should be first adjusted so that the two small wheels will be in contact with the ground when the bicycle is upright, and as the rider acquires more confidence the said wheels are to be gradually raised by means of the adjustment before described, and when sufficient progress has been made to enable the rider to dispense with the use of the support then said support may be lifted to its highest position, entirely out of contact with the ground, so as not to touch the ground when the wheel is inclined either to one side or the other in turning corners or the like.

Of course this attachment may be of considerable utility merely as a means of supporting the bicycle when the rider has occasion to dismount, whereby the wheel may be held in an upright position, thereby overcoming the objection of resting the bicycle against any part of the frame.

The various parts of the attachment are finished in a suitable manner, conforming to the machine to which it is to be applied, and the whole is to be made of the best material that will give strength and durability with the least weight, and the small wheels may be mounted upon roller or ball bearings, if desired, though such construction would slightly increase the cost of the attachment.

I claim as my invention—

1. The herein-described wheel-support for bicycles consisting of a supplemental fork adapted to embrace the rear wheel of a bicycle, a bar hinged to its upper end and adjustably secured to the frame of the bicycle, guide-brackets on both legs of the supplemental fork through which said legs loosely pass, clamps on said brackets securing the same to the rear axle of the bicycle, with small wheels journaled in the lower ends of the legs of the fork, substantially as described.

2. The combination with a bicycle, of a detachable wheel-support consisting of a supplemental fork embracing the rear wheel of a bicycle, friction-clamps secured to the axle of said wheel outside of the frame and provided with guide-lugs through which the legs of the fork loosely pass, an inclined bar rigidly secured to the seat-pole, with a bar hinged to the supplemental fork and adjustably connected to said inclined bar, substantially as described.

3. The combination with a bicycle, of a detachable wheel-support consisting of a slotted inclined bar rigidly secured to the frame of the bicycle, a slotted bar slidably mounted thereon, a set-screw passing through the slots in said bar and adjustably connecting them together, a supplemental fork hinged to the movable bar at its lower end and provided with horizontal extensions at the lower end, brackets clamped to the axle of the wheel outside of the frame and provided with guide-lugs through which the legs of the fork loosely pass, and set-screws in said lugs adapted to hold the legs of the fork in the desired position, substantially as described.

4. The herein-described improvement in bicycle-wheel supports consisting of a supplemental fork adapted to embrace the rear wheel of the bicycle, an adjustable hinge connection between said fork and the seat-support, friction-clamps provided with guide-lugs through which the legs of the fork loosely pass, said clamps being secured to the rear axle of the bicycle, and supporting-wheels journaled on horizontal extensions at the lower ends of the legs of the fork, substantially as described.

5. The herein-described bicycle attachment, consisting of a fork, having wheels journaled on the lower ends of the legs, guiding-brackets loosely mounted on said legs and provided with set-screws for clamping the two together, and clamping-jaws on said brackets adapted to clamp the same to the axle of the bicycle-wheel, a bar hinged to the other end of the fork, a second bar slidably connected therewith, and provided with a strap for rigidly securing the same to the bicycle-frame, substantially as described.

In testimony whereof I have signed my name to this specification in the presence of two subscribing witnesses.

WILLIAM ARCHIE DOUGLASS.

Witnesses:
W. C. ATKINSON,
J. H. PUTMAN.